June 19, 1956     J. G. SCHWEMBERGER     2,751,338
PROCESS OF VAPORIZATION OF HYDROGEN PEROXIDE SOLUTIONS
Filed Nov. 27, 1951
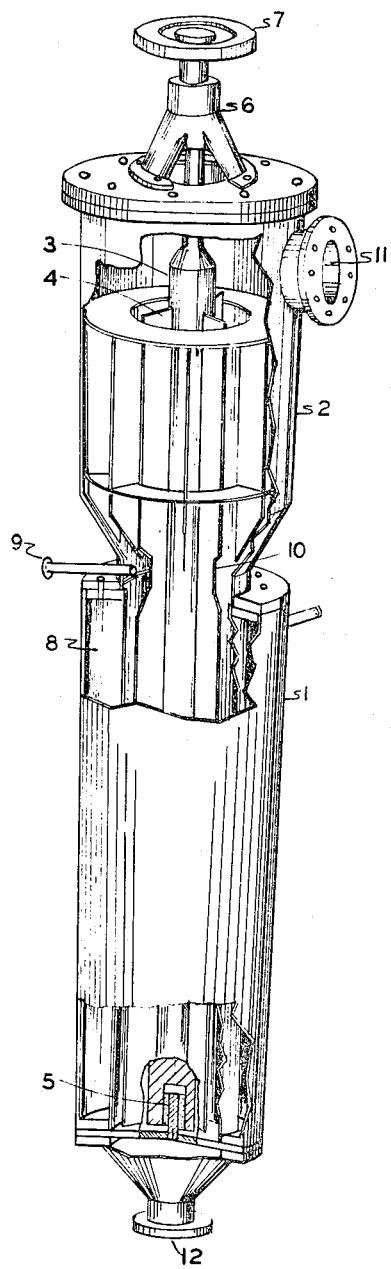
*INVENTOR.*
JOHN G. SCHWEMBERGER
BY
*Amos T. Cole*
AGENT

United States Patent Office 2,751,338
Patented June 19, 1956

2,751,338

PROCESS OF VAPORIZATION OF HYDROGEN PEROXIDE SOLUTIONS

John G. Schwemberger, Buffalo, N. Y., assignor to E. I. du Pont de Nemours and Company, Wilmington, Del., a corporation of Delaware Application November 27, 1951, Serial No. 258,509

8 Claims. (Cl. 202—63)

This invention relates to the vaporization of hydrogen peroxide solutions, particularly from a film of the solution.

It has previously been proposed to vaporize hydrogen peroxide solutions from heated inclined surfaces in conjunction with purifying and/or concentrating operations. However, such a method has found only limited commercial application due largely to the poor heat transfer from the heated surface to the falling film with resultant low vaporizing capacity per unit of vaporizing area. This invention relates to an improvement of methods for vaporizing hydrogen peroxide solutions from films thereof whereby highly efficient heat transfer is realized and the vaporizing capacity is greatly increased.

It is an object of the invention to provide an improved method for vaporizing hydrogen peroxide solutions. A particular object is to provide an improved method for vaporizing such solutions from films thereof, whereby excellent heat transfer to the film is realized with resultant greatly increased vaporizing capacity. A still further object is a method whereby unstabilized hydrogen peroxide solutions can be rapidly and efficiently vaporized from films thereof on metal surfaces with substantially no loss in peroxide due to decomposition. Still further objects will be apparent from the following description.

The above objects are accomplished in accordance with the invention by providing a film of the hydrogen peroxide solution to be vaporized on a surface heated to a temperature effective to cause vaporization from the film, while turbulently agitating the film. It has been discovered that vaporization of the peroxide solution from such a turbulently agitated film occurs very rapidly with excellent heat transfer from the heat source to the film. Furthermore, and in view of the efficient transfer of heat with resulting rapid vaporization, relatively high heating temperatures can be employed at resultant high vaporization rates, when vaporizing unstabilized solutions.

The method of the invention requires that the film being vaporized be turbulently agitated during vaporization. By "turbulently agitated" it is meant that the film is agitated to such an extent or degree that turbulent flow occurs in the film, as contrasted with viscous or streamline flow. "Turbulent flow" is generally recognized as distinct from viscous flow and is used herein in accordance with its generally accepted hydrodynamic meaning.

The vaporizing surface will of course be within a vaporizing vessel and, conveniently, will be the inner walls of such vessel. Associated with the vessel will be a product recovery system of any desired type, preferably one leading to a vacuum source permitting vaporization under reduced pressure. The vaporizing surface preferably will be inclined sufficiently from the horizontal to cause a solution fed thereto to flow generally downward over the surface. The solution to be vaporized can be flowed onto the vaporizing surface, or it can be supplied thereto in finely divided form but is preferably supplied in one or more continuous streams. Most preferably, the means employed for turbulently agitating the film will be used to distribute the feed solution as a film onto the surface.

The film of solution can be agitated by any means which is effective to cause turbulent flow in the film. Vibrators can be used; also, agitators in the form of blades, vanes, strips, wires, or the like, which are caused to cut or sweep rapidly and continuously or repeatedly through the film. When using the inclined walls of a cylindrical vaporizing vessel as the vaporizing surface, one especially effective way of turbulently agitating the film is to rotate within the vessel at a suitable speed an agitator bearing a number of longitudinal vanes or blades whose outer edges are in such close proximity to the walls of the vessel as to continuously cut through the falling film of liquid when the agitator is rotated. If desired, such vanes or blades can be stationary and the vessel rotated, or both may be rotated in opposite directions, or in the same direction but at sufficiently different speeds to produce the same effect. It is preferred to employ a plurality of rapidly rotating longitudinal vanes within a vertical cylindrical vaporizing vessel. In such an arrangement, the clearance between vane edges and the vessel walls should be sufficiently close that the vanes, upon being rotated, will continuously sweep or cut through the falling film of peroxide solution. Thus, the clearance should be less than the normal thickness of the film. Clearances of the order of 0.01 to 0.1 in. are generally suitable; a clearance of about 0.02 to 0.07 in. is preferred.

The method of the invention can be carried out so as to effect either partial or complete vaporization from the film on the vaporizing surface. When the solution being vaporized contains impurities, particularly those which catalyze hydrogen peroxide decomposition, it is distinctly advantageous to carry out the vaporization under such conditions that a substantial amount of the feed solution remains unvaporized and flows from the vaporizing surface. Such flow of unvaporized solution, even in amounts as small as 0.5% to 5% by volume of the feed solution, is effective in preventing or inhibiting accumulation on the vaporizing surface and in the film being vaporized of those impurities which catalyze decomposition of hydrogen peroxide and are generally present only in small or trace amounts. In cases where the $H_2O_2$ content of the unvaporized solution is sufficiently high to make handling hazardous, it is advantageous to dilute the solution as it flows from the vaporizing surface to a safe $H_2O_2$ content. The features of effecting vaporization from films under such conditions that unvaporized solution flows from the vaporizing surface, of diluting such solution as indicated, and the advantages attending such practices, are more fully described in the copending application of Inman, S. N. 259,491, filed December 1, 1951.

The invention is illustrated by the following examples.

*Example 1*

A vertically positioned cylindrical unit, shown in perspecitve in the drawing having a vaporizing section 1 2⅜" I. D. by about 18" was employed. The unit included a short section 2 above the vaporizing section which functioned as an entrainment separator. Running from top to bottom of the unit in axial alinement therewith was an agitator assembly consisting of a shaft 3 bearing 3 longitudinal vanes 4. The lower end of the shaft was seated in a bearing 5 positioned within the vaporizer while the upper end extended through a rotary seal (not shown) in the cover of the vaporizer and an outside bearing 6. The shaft was driven by a motor, through pulleys and a belt, only one pulley 7 being shown in the drawing. The clearance between the vane edges and the vaporizer walls was 0.0375". A steam jacket 8 surrounded the vaporizing section, and a feed line 9 was provided for delivering solution to be vaporized into the side of the unit just above the vaporizing section. Each vane was cut away slightly at the point 10 thereon adjacent the feed line. The rapid rotation of the agitator assembly deposited the feed solution on the vaporizer walls in the form of a film.

The entrainment separator was provided with a vapor exit line 11 connected through a product condenser system (not shown) to a vacuum source. The bottom of the vaporizer was provided with a drain line 12 leading to a drainage container (not shown) which was also connected to the vacuum source. The walls, head and bottom of the unit as well as all parts of the agitator assembly were constructed of stainless steel.

A crude hydrogen peroxide solution made by a cyclic process involving alternately hydrogenating and oxidizing an alkylanthraquinone was vaporized in the above equipment. The solution was fed at the rate of 34.5 lbs./hr. during a 6.5 hr. period. The feed solution contained 26.0% $H_2O_2$ by weight and 0.1 g./l. of added sodium pyrophosphate decahydrate stabilizer. Steam was supplied to the steam jacket at 14 p. s. i. (120° C.). The vapor temperature at the vapor exit was 49° C. and the pressure 69 mm. Hg.

The vaporizing surface was 0.92 square feet and the agitator was rotated during operation at 3400 R. P. M. corresponding to a peripheral velocity for the vanes of 2047 feet per minute. The $H_2O_2$ content of the product recovered in the condensing system ranged from around 26.3 to 27.17% by weight and 95.8% of the $H_2O_2$ fed was recovered in the condensate. 3.3% of the $H_2O_2$ fed was recovered as unvaporized material so that the total recovery of $H_2O_2$ was 99.1%. The product was stabilized by the addition of 0.5 g./l. $NH_4NO_3$, 0.13 g./l. $Na_4P_2O_7.10H_2O$ and 0.145 g./l. $Na_2SnO_3.3H_2O$, followed by adjustment of the pH to the neutral point for the solution. Samples of the stabilized product lost only 0.56 to 0.68% of their peroxide contents when heated for 15 hours at 100° C. When samples of the crude feed material, after being stabilized by the same manner, were heated under similar conditions, the peroxide loss was 3.4 to 3.5%.

*Example 2*

Crude aqueous hydrogen peroxide solution from the same stock used in Example 1 and containing 0.1 g./l. sodium pyrophosphate decahydrate was vaporized in the manner and with the equipment described in Example 1 except that the agitator was rotated at 2380 R. P. M., corresponding to a peripheral velocity for the vanes of 1433 feet per minute, and the feed rate was lowered to 21.5 lbs./hr. so as to obtain approximately the same proportion of the feed as overhead product as was obtained in Example 1. This feed rate was maintained for 6 hours. The results were substantially the same as obtained in Example 1, except that the vaporizing capacity was reduced by 37.7% as a result of the slower agitator speed.

*Example 3*

Crude aqueous hydrogen peroxide solution from the same stock used in Example 1 was vaporized substantially as described in Example 1 except that the feed material contained no added stabilizer for peroxide. The solution was fed at a rate of 22.9 lbs./hr. during 5.5 hours while running the agitator at 2380 R. P. M. and supplying steam to the steam jacket at 11 p. s. i. g. (116.5° C.). The vapor temperature at the exit was 50° C. and the pressure 50 mm. Hg. About 2.6% of the $H_2O_2$ fed remained unvaporized while the total $H_2O_2$ recovery was substantially quantitative. After stabilizing the product as described in Example 1, a sample heated for 15 hours at 100° C. lost 0.9% of its $H_2O_2$ content.

*Example 4*

A crude unstabilized aqueous hydrogen peroxide solution made by the persulfuric acid electrolytic method and containing 34.0% $H_2O_2$ by weight was vaporized in the general manner described in the above examples. In this run, the clearance between the agitator vanes and the vaporizer wall was 0.02" and the agitator was rotated at 3400 R. P. M. The solution was fed at a rate of 31.0 lbs./hr. for 5 hours during which time steam was supplied to the steam jacket at 13 p. s. i. g. (119° C.). The vapor temperature at the exit was 55° C. and the pressure 59 mm. Hg. Of the $H_2O_2$ fed, 1.1% was recovered as unvaporized material and 98.0% as product condensate. The product contained 32.8% $H_2O_2$ by weight. After being stabilized as in Example 1, the loss of peroxide in a sample when heated to 100° C. for 15 hours was 0.78%. Crude solutions of the type used in this run, even after being stabilized as was the product in Example 1, generally lose most or all of their peroxide contents through decomposition when subjected to these test conditions.

In each of the above examples, the pH of the crude solution fed to the vaporizer and the pH of the product after addition of stabilizers, were adjusted to approximately the neutral point by the addition of either ammonium hydroxide or nitric acid, as required, since peroxide solutions are most stable at their neutral points. When measure by means of a Beckman pH meter using a glass electrode and expressing the neutral point in terms of ordinary "pH" values, the neutral points of hydrogen peroxide solutions of 28, 35, and 50% $H_2O_2$ concentrations by weight are approximately 4.3, 3.7 and 2.6, respectively, as compared with a neutral point for water of 7. Thus the neutral point in terms of "pH" values decreases as the concentration increases. The addition of but a small quantity of either a base or an acid to a hydrogen peroxide solution at its neutral point results in a marked change in the pH value of the solution.

The present method may be employed effectively to vaporize either stabilized or unstabilized peroxide solutions. If the solution being vaporized contains a non-volatile solid stabilizer such as sodium pyrophosphate, a solid coating of the stabilizer may be formed on the vaporizing surface. However, continuous build-up of such a coating is not possible because of the scraping action of the rotating vanes as the coating tends to bridge the space between the vaporizer wall and the vane edges. When no solid non-volatile stabilizer is present in the feed, the vaporizing surface generally will remain clean and free from solid deposits, particularly when unvaporized solution is permitted to flow from the vaporizing surface. This is a distinct advantage since heat transfer is more effective under these conditions. The method is not restricted to vaporization of solutions of any particular $H_2O_2$ content and can be used to vaporize either dilute or concentrated solutions, e. g., solutions containing up to 70% or more $H_2O_2$.

It is entirely surprising that unstabilized crude peroxide solutions can be efficiently vaporized in accordance with the invention without substantial decomposition of peroxide resulting. Heretofore, no practical method for vaporizing unstabilized peroxide from a film on an uncoated surface has been proposed or used.

The examples show operations in which the vaporizer walls are vertically positioned but it should be understood that the vaporizing surface can be any surface on which a turbulent moving film can be maintained. The use of vertically positioned vaporizing surfaces is preferred for mechanical reasons. The vaporizing equipment may be constructed of any of the usual construction materials, preferably metals, which are resistant to and do not decompose peroxide excessively in either vapor or solution form. Vaporizing surfaces of aluminum, tin and various other metals or alloys are preferred over non-metallic surfaces and the use of stainless steel for this purpose is most preferred. Stainless steel of A. I. S. I. Numbers 304, 316, 317, 321 and 347 are especially satisfactory.

Hydrogen peroxide is sensitive to heat and tends to decompose more or less rapidly at high temperatures. It is therefore desirable to effect the vaporization at temperatures as low as possible. Ordinarily subatmospheric pressures will be employed so that temperatures above about 100° C. can be avoided. Temperatures below 70° C. are preferred. The vaporizing surface should of course be maintained at a temperature sufficiently high to cause rapid vaporization at the pressures employed, but temperatures substantially above those necessary to effect vaporization at the desired vaporizing rates are best avoided. It is somewhat surprising that temperatures considerably higher than can be used in prior methods can be employed effectively in practicing the present invention without danger of decomposition. The vaporizing capacity per unit of surface when employing the present method has been found to be about 2 to 4 times as great as great as when vaporizing from a film under viscous flow on a coating of stabilizer.

The invention may be practiced to obtain solutions substantially free from non-volatile impurities, particularly those which, though present in trace amounts, actively catalyze peroxide decomposition. Non-volatile impurities present in larger amounts may also be effectively removed. The invention can also be used as a means for concentrating peroxide solutions, e. g., by subjecting the vapors to suitable absorption or fractional condensation treatments.

I claim:

1. In a method for vaporizing hydrogen peroxide solutions in which vaporization is effected from a film of the hydrogen peroxide solution on a heated vaporizing surface, the step comprising turbulently agitating a film of said solution on a heated metallic vaporizing surface to prevent substantial decomposition of hydrogen peroxide during said vaporization.

2. The method of claim 1 wherein the vaporizing surface is inclined substantially from the horizontal.

3. The method of claim 1 wherein the solution being vaporized is unstabilized.

4. The method of claim 1 wherein vaporization is effected from a falling film of the solution on a vertical vaporizing surface.

5. The method of claim 1 wherein complete vaporization is effected on the vaporizing surface.

6. The method of vaporizing hydrogen peroxide solutions comprising supplying an aqueous hydrogen peroxide solution to the inner vertical metallic walls of a vaporizer to provide a falling film of said aqueous solution on said walls, said walls being heated to a temperature effective to cause vaporization from said falling film, and turbulently agitating said falling film on said walls to prevent substantial decomposition of hydrogen peroxide during said vaporization.

7. The method of claim 6 wherein vaporization is effected under reduced pressure and at a vapor temperature not exceeding 100° C.

8. The method of claim 6 wherein the heated walls of the vaporizer are stainless steel.

References Cited in the file of this patent

UNITED STATES PATENTS

| | | |
|---|---|---|
| 1,323,075 | Levin | Nov. 25, 1919 |
| 1,732,805 | D'Yarmett | Oct. 22, 1929 |
| 2,091,218 | Schmidt | Aug. 24, 1937 |
| 2,403,978 | Hickman | July 16, 1946 |
| 2,491,732 | Hawkinson et al. | Dec. 20, 1949 |
| 2,460,602 | Semon | Feb. 1, 1949 |
| 2,500,900 | Madlen | Mar. 14, 1950 |
| 2,520,870 | Wood et al. | Aug. 29, 1950 |
| 2,539,699 | Perry et al. | Jan. 30, 1951 |

FOREIGN PATENTS

| | | |
|---|---|---|
| 447,065 | Italy | Aug. 25, 1948 |